United States Patent [19]

Susor, deceased

[11] Patent Number: 4,492,280

[45] Date of Patent: Jan. 8, 1985

[54] WEIGHING APPARATUS INCLUDING LOAD CELLS WITH INTRINSIC SAFETY BARRIER

[75] Inventor: William C. Susor, deceased, late of Westerville, Ohio, by Rita M. Susor, executor

[73] Assignee: Masstron Scale Inc., Columbus, Ohio

[21] Appl. No.: 470,251

[22] Filed: Feb. 28, 1983

[51] Int. Cl.³ .......................... G01G 3/14; G01L 1/22
[52] U.S. Cl. .................................. 177/211; 73/862.67
[58] Field of Search .............................. 177/211, 180; 73/862.67

[56] References Cited

U.S. PATENT DOCUMENTS

| | | | |
|---|---|---|---|
| 3,917,979 | 11/1975 | Volk, Jr. ................................ | 361/50 |
| 4,019,519 | 4/1977 | Geerling ............................ | 128/422 |
| 4,320,809 | 3/1982 | Knothe et al. ...................... | 177/243 |
| 4,416,343 | 11/1983 | Knothe et al. ...................... | 177/180 |

OTHER PUBLICATIONS

Intrinspak, Stahl, Safety Barriers for Intrinsically-Safe Wiring into Hazardous Locations, Excerpt of Manual 89-016-03-310.

Primary Examiner—George H. Miller, Jr.
Attorney, Agent, or Firm—Yount & Tarolli

[57] ABSTRACT

Weighing apparatus including plural load cells. The load cells have parallel-connected inputs and outputs. The paralleled load cells are connected to a voltage measuring instrument through intrinsic safety barriers. The internal resistances of the load cell are selected such that excitation current limitations imposed by the intrinsic safety barriers are not exceeded and that the load cell output voltage variation accompanying a one grad change in the weight applied to the apparatus is great enough to be measurable by the instrument.

6 Claims, 4 Drawing Figures

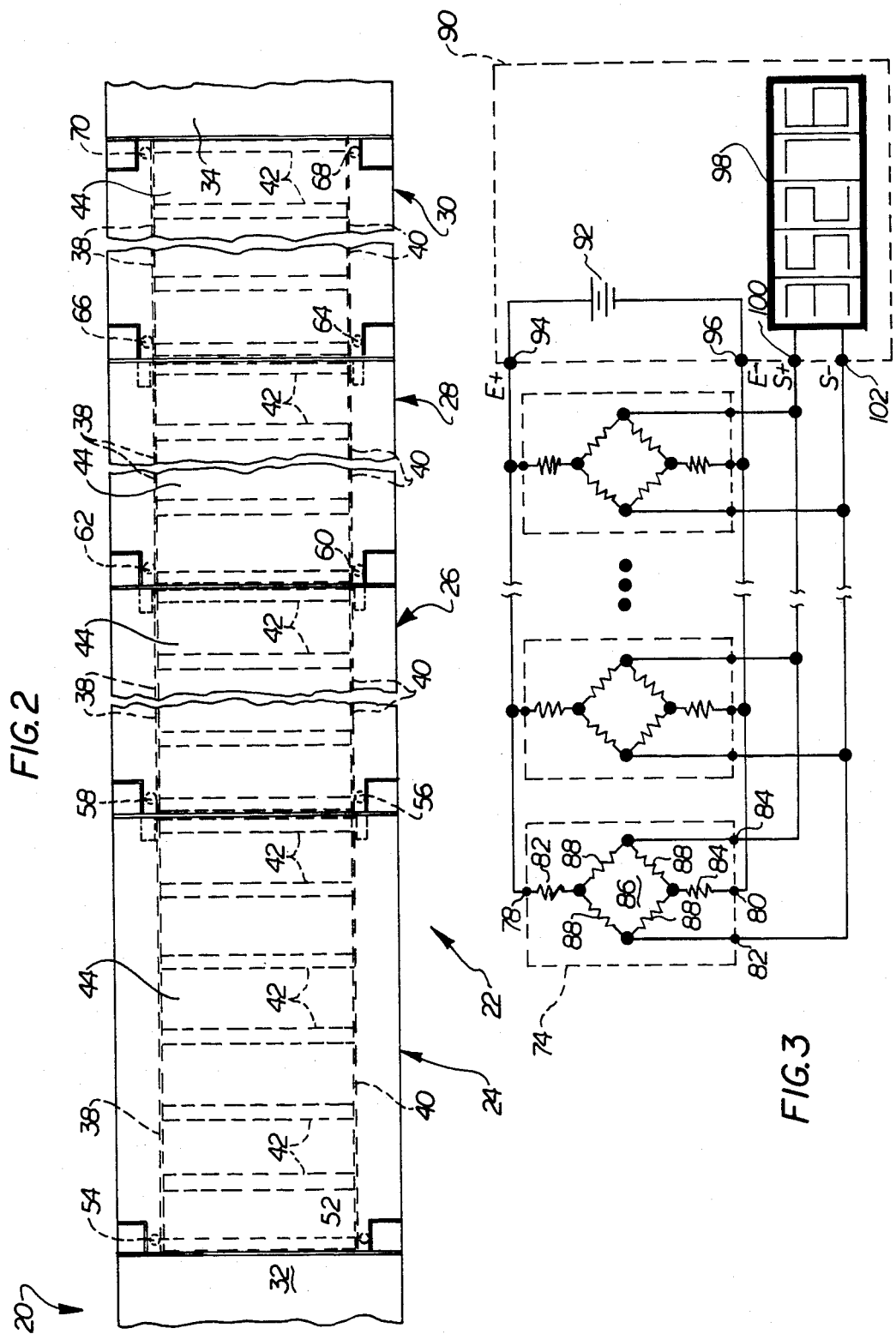

WEIGHING APPARATUS INCLUDING LOAD CELLS WITH INTRINSIC SAFETY BARRIER

BACKGROUND OF THE INVENTION

This invention relates to a weighing apparatus and particularly to a weighing apparatus for weighing loads in a hazardous environment. In particular, the present invention relates to weighing apparatus which uses load cells to provide a weight indication.

A load cell is a transducer which provides an electrical signal having a magnitude related to the force applied to the cell. Load cells are used in apparatus for weighing a variety of loads including large transport vehicles such as railroad cars and trucks. A typical load cell weighing apparatus has a weighing platform which is supported at a number of spaced points by load cells. The load cells are connected to a remote instrument which powers the load cells and provides a weight indication in response to the electrical signal provided by the load cells.

Weighing apparatus of the above type is sometimes used in environments wherein explosions may result from electrical discharges. Usually the weighing instrument, itself, is situated within a safe area, and the weighing platform and the load cells are located in the unsafe environment. The voltage and current levels present in the load cells are normally low enough that there is no danger of electrical discharge. If the load cell were to fail, however, the voltages and/or currents in the load cells could reach dangerous levels. To limit the voltages and/or currents in the load cells to safe levels, circuits known as "intrinsic safety barriers" are interposed in each electrical line between the load cell and the instrument.

Intrinsic safety barriers normally permit the free flow of electrical signals between the safe and unsafe areas. The barriers block excessive voltages and currents, however. The intrinsic safety barriers thus keep the electrical energy in the circuits in unsafe areas so low that ignition of combustion mixtures due to an electrical discharge cannot occur even under adverse or abnormal conditions.

When intrinsic safety barriers are provided, a signal voltage drop occurs across each barrier. In many types of apparatus this voltage drop is of no consequence. It can be important, however, in apparatus wherein signals affected by the voltage drop are already at low levels. Weighing apparatus falls into this category.

Specifically, the use of intrinsic safety barriers constrains the number of load cells which may be used in the weighing apparatus. The current drawn by the load cells is related to the number of load cells employed. As the number of load cells is increased, current drawn through the intrinsic safety barriers increases. Because of this, no more than, for example, four load cells can be used in a weighing apparatus without exceeding the current limitation imposed by the intrinsic safety barrier. Unfortunately four load cells is too few to accurately weigh a large distributed weight, as is required in some applications.

The change in output voltage accompanying a minimum graduation weight change also diminishes as the number of load cells increases. If only one load cell is used, for example, its output voltage may change by 18 microvolts (uv) for a 20 lb change in applied weight. If ten load cells are used, the same weight change will produce only a 1.8 uv change in output signal. The instrument whose task it is to measure this voltage may, however, be unable to accurately measure low level changes of this nature. Thus, the number of load cells which can be used is also limited by the sensitivity of the instrument to which they are connected.

SUMMARY OF THE INVENTION

The present invention provides weighing apparatus with intrinsic safety barriers and which includes any number of load cells. More specifically, the present invention provides a technique for determining the load cell resistance for such a weighing apparatus.

Weighing apparatus is provided which includes more than four load cells, where each load cell has excitation input terminals and signal output terminals. All of the excitation input terminals of the load cells are connected in parallel and all of the signal output terminals are also connected in parallel. A voltage source is included for supplying an excitation voltage. The voltage source output terminals are coupled across the parallel-connected excitation input terminals of the load cells. At least one intrinsic safety barrier is connected between the voltage source and load cells. The intrinsic safety barrier attenuates the excitation voltage ($E_1$) such that only a fraction (A) of the voltage reaches the excitation input terminals. A voltage measuring circuit is coupled to the parallel-connected signal output terminals of the load cells. The voltage measuring circuit has a sensitivity of (S) voltage units per graduation of input signal change. The internal resistances of the load cells are such that:

(1) no more than a preselected level of load current passes through the intrinsic safety barrier(s), and (2) the fraction A has a value such that ($E_G$) times (A) is greater than (S), where $E_G$ is the output voltage variation per grad weight change when A is equal to one.

BRIEF DESCRIPTION OF THE DRAWINGS

In order that the invention is better understood, it will now be described in detail, by way of a non-limiting example, with reference to the accompanying drawings, wherein:

FIG. 2 is a plan view of a platform assembly used in the weighing apparatus of FIG. 1;

FIG. 3 is a conventional multiple load cell bridge circuit arrangement; and

DESCRIPTION OF A PREFERRED EMBODIMENT

In the detailed description which follows, the abbreviation "mv" is used for "millivolts" ($10^{-3}$ volts) and the abbreviation "uv" is used for "microvolts" ($10^{-6}$ volts).

Figure 1:
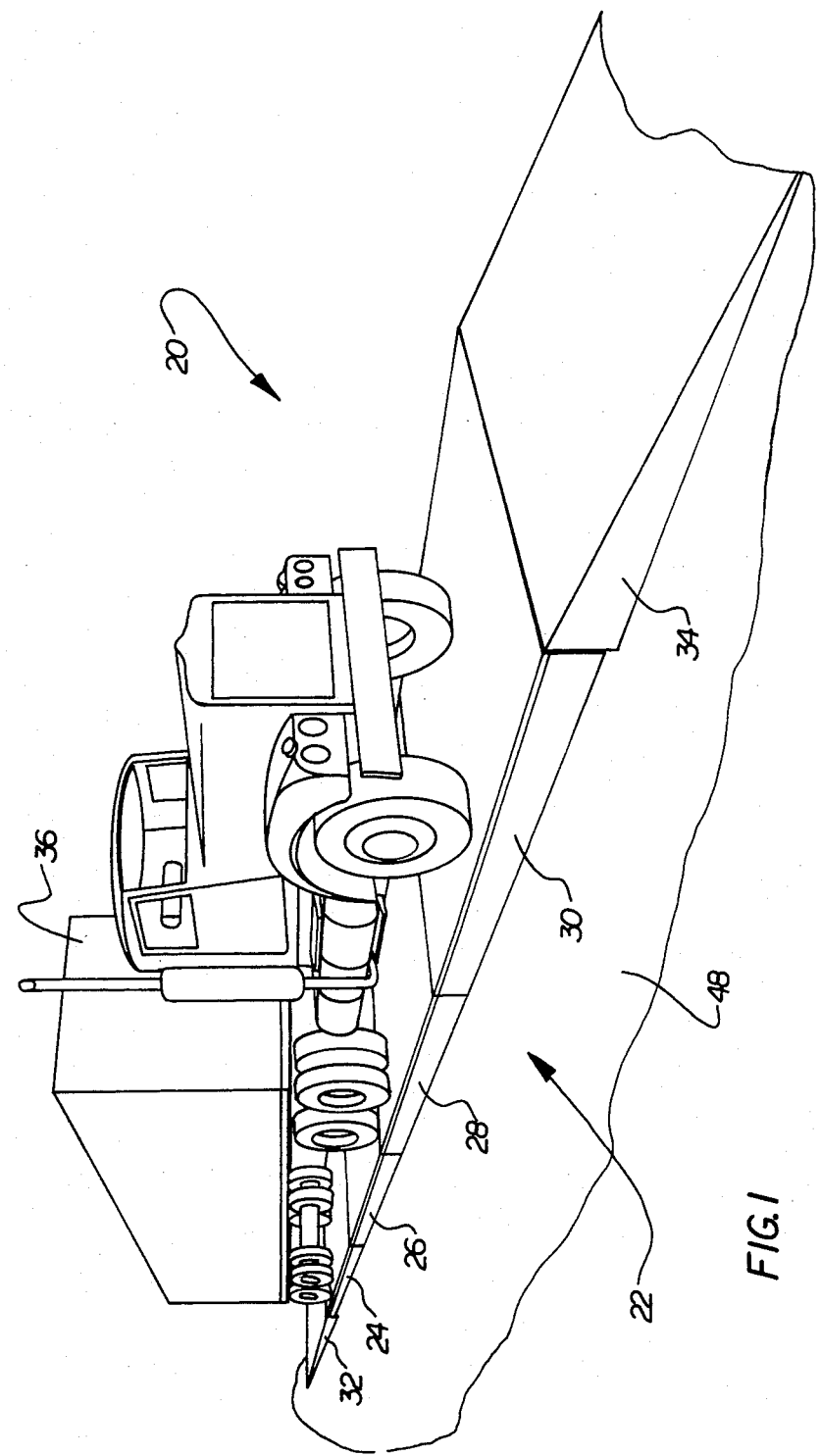
FIG. 1 is a pictorial illustration of weighing apparatus in which a weigh bridge arrangement of the present invention is used.

A weighing apparatus 20 (FIG. 1) includes a weighing mechanism comprising a platform assembly 22 having a plurality of longitudinally extending platforms 24, 26, 28 and 30. The platforms 24–30 are disposed in a linear array between an entrance ramp 32 and an exit ramp 34. The ramps 32 and 34 enable a vehicle 36 to be driven onto and off from the platform assembly 22.

Each of the platforms is provided with a pair of longitudinally extending box support sections 38 and 40 (see FIG. 2). The support sections 38 and 40 are disposed along opposite longitudinal edges of the platforms 24–30 and extend parallel to each other through the length of the platforms.

The support sections 38 and 40 are interconnected by a plurality of cross beams 42. A deck plate 44 extends over the top of the cross beams 42 and forms the top wall of the support sections 38 and 40.

The weighing apparatus 22 includes a plurality of load responsive weighing units 52, 54, 56, 58, 60, 62, 64, 66, 68 and 70 which are associated with the various weighing platforms 24–30 (see FIG. 2). The weighing units may be of any conventional construction and are connected with the instrument by suitable electrical circuitry.

Each weighing unit includes a load cell. Typically, the load cells include four strain gauge elements connected together in a bridge arrangement. In a multiple load cell arrangement, the inputs and outputs of all of the load cells are connected in parallel with one another. This is shown in FIG. 3, which is a schematic of a conventional load cell arrangement.

The multiple load cell circuit 72 shown in FIG. 3 includes a number of individual load cells 74. Three of such load cells are shown, however any desired number of load cells may be connected in parallel fashion. Each load cell includes input terminals 78 and 80 and output terminals 82 and 84. Each load cell further includes a bridge circuit 86 formed of four strain gauge elements 88. Two opposing terminals of the bridge circuit 86 are shown connected to the input terminals 78 and 80 of the load cell through respective resistances 82 and 84. The resistances 82 and 84 will actually comprise resistance networks including temperature compensation and calibration components, however for the purposes of the present discussion may be modeled as the single resistances shown. The remaining two terminals of the bridge circuit 86 are connected to the output terminals 82 and 84 of the load cell.

When an excitation voltage is applied across terminals 78 and 80 of the load cell, an output signal is developed across terminals 82 and 84. The magnitude of the output signal is dependent upon the magnitude of the excitation voltage applied across the load cell input terminals and upon the magnitude of the force applied to the structural element upon which the strain gauge elements 88 are attached.

As shown in FIG. 3, all of the load cells in the multiple load cell arrangement are connected across the input and output terminals of an instrument 90. The instrument 90 includes a voltage source 92 connected across excitation terminals 94 and 96 of the instrument. The excitation input terminals 78 and 80 of all of the load cells 74 are connected to the excitation terminals 94 and 96, respectively, of the instrument 90. The instrument 90 also includes a voltage measuring and display circuit 98 which measures the magnitude of the voltage signal appearing on the two input terminals 100 and 102 of the instrument 90. The output terminals 82 and 84 of all of the load cells 74 are connected to the terminals 100 and 102, respectively, whereby the voltage signal being measured by the circuit 98 corresponds to a compositive of the signals provided by the individual load cells 74. The signal has a magnitude which is representative of the total weight applied to the entire weighing platform.

Figure 4:
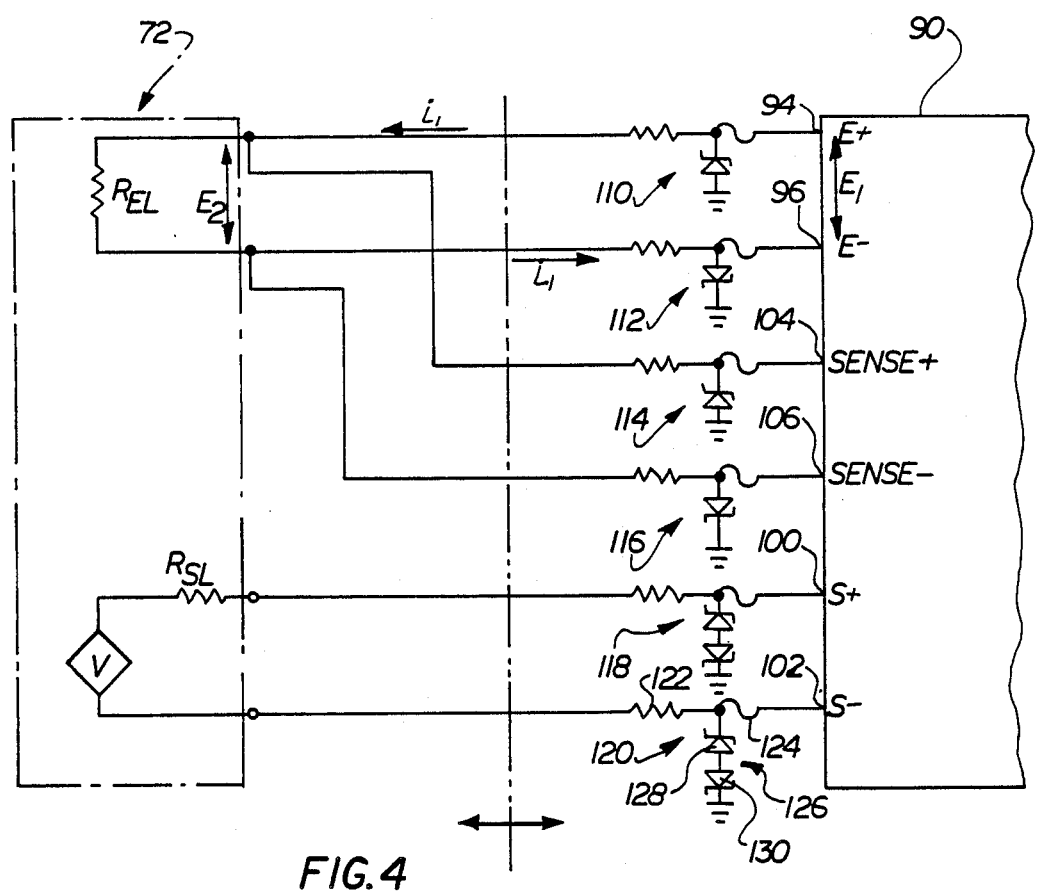
FIG. 4 is a multiple load cell weighing configuration for a hazardous environment.

When the weighing device is located in a hazardous environment, it is desirable or necessary to interpose safety barriers in each of the electrical lines between the instrument (which is in a safe location) and the load cells. Such an arrangement is shown in FIG. 4. The multiple load cell circuit 72 is represented by its Thevenin equivalent model in FIG. 4 to simplify discussion. In the model, the load cell is characterized as a fixed resistance $R_{el}$ (the subscript "el" stands for "excitation leads") connected across the excitation terminals 94 and 96, and as a voltage source V in series with a second fixed resistance $R_{sl}$ (the subscript "sl" stands for "signal leads") connected across the signal terminals 100 and 102.

The excitation signal reaching the load cells may be different than the voltage being provided by the instrument on terminals 94 and 96, due to voltage drops between the output terminals 94 and 96 of the instrument 90 and the excitation input terminals of the load cells. The instrument 90 shown in FIG. 4 takes this into account by actually measuring the voltage appearing across the excitation terminals of the load cells. The instrument has "sense" terminals 104 and 106 which are connected to the excitation input terminals of the load cells for this purpose. Significant voltage drops will not occur between the excitation input terminals of the load cells and the input terminals 104 and 106 since insignificant levels of current pass through those lines. The instrument measures the voltage on the "sense" terminals and uses that measurement to correct the readings taken from the load cells.

The FIG. 4 weighing apparatus includes an intrinsic safety barrier (110–120) in each line between the instrument 90 and the multiple load cells 72. The intrinsic safety barrier 120 is representative, and includes a series resistance 122, a series fuse 124, and a shunt voltage limiting circuit 126 including two back-to-back zener diodes 128 and 130. If the voltage appearing on the terminal 102 of the instrument 90 exceeds a certain threshold level, the voltage limiting circuit 126 begins to conduct, shunting current to ground. If the current becomes too great, fuse 124 blows open, thereby isolating the instrument from the load cells 72. The fuse 124 will blow open if excessive currents pass through it, even if the applied voltage is not great enough to trigger the voltage limiting circuit 126. Hazardous voltage and/or current levels are thus prevented from reaching the instrument 72. The other intrinsic safety barriers 110–118 are all similar to intrinsic safety barrier 120. In some of the voltage limiting circuits, however, one of the two zeners is deleted since only one polarity of voltage signal is expected at the associated instrument terminal.

The inclusion of intrinsic safety barriers in the system in the fashion indicated in FIG. 4 affects the operation of the circuit, and inherently limits the number of conventional load cells which can be utilized in the multiple load cell arrangement 72. The resistance associated with intrinsic safety barriers 110 and 112 incur voltage drops across them as a result of the supply current passing to the load cells 72 from the instrument 90. The voltage drops reduce the magnitude of the excitation voltage reaching the excitation input terminals of the load cells 72, and thus also reduce the magnitude of the voltage signal provided at the outputs of the load cells.

The reduction in excitation voltage at the load cells can be compensated for to some extent by increasing the magnitude of the excitation voltage appearing across terminals 94 and 96 of the instrument 90. As the excitation voltage is increased, the magnitude of the current passing through the intrinsic safety barrier is also increased. The supply voltages and currents are limited, however, by the voltage and current limits designed into the intrinsic safety barriers. If an adequate excitation voltage is not applied across the excitation input terminals to the load cells, however, the output signal provided by the load cells may not provide a necessary level of voltage variation of each graduation of applied weight.

A typical load cell is capable of measuring changes corresponding to approximately 0.06% of the maximum load. The minimum graduation of measurement for a single load cell is thus 0.06% of full load. Since a typical load cell has a load capacity of 35,000 lbs, one measurement graduation represents about 20 pounds. If the maximum cell output is 30 mv, then a change of 0.06% of that, or 18 uv, corresponds to a one grad change in the applied load.

As the number of cells is increased, the sensitivity of the cells remains approximately the same. Thus, if one cell is capable of resolving weight differences of 20 pounds (i.e., 1 grad=20 lbs), then a ten cell system will also be capable of resolving weight differences of approximately 20 pounds. The total cell capacity, however, increases in direct proportion to the number of cells used. Therefore, the percentage of the maximum capacity corresponding to a one grad change in the output diminishes. More specifically, a load cell arrangement including N load cells will be capable of resolving weight differences corresponding approximately to the maximum capacity of the system times (0.06%/N). Since the maximum millivoltage output of multiple cell arrangements remains approximately the same as the maximum output of a single cell (e.g., 30 mv), it follows that the amount of change in the output voltage provided by the multiple cell arrangement which is representative of a one grad load change is now equal to: (30 mv) (0.06%/n). Thus, if five load cells are included in the system, then a change of 3.6 uv represents a one grad change in the load applied to the cell. Similarly, if ten load cells are included in the system, a change of only 1.8 uv is representative of a one grad change in the output signal provided by the cell. Thus, as the number of load cells included in the system is increased, sensitivity required of the instrument used to measure the voltage must also be increased in order to be able to measure each grad change in the multiple load cell output signal.

Most measuring instruments are incapable of accurately measuring input signal changes of less than approximately 0.75 uv. Changes below this magnitude become submerged in noise, preventing accurate determination of their amplitude. Consequently, the one grad change in the multiple load cell output signal should be greater than 0.75 uv. In the situation postulated above, wherein ten load cells are utilized, the load cells having a maximum output voltage of 30 mv, a one grad change in the output signal is 1.8 uv, well above the 0.75 uv threshold.

Unfortunately, the intrinsic safety barriers in a system reduces the excitation voltage available at the input terminals through the multiple load cells, and thus attenuate the output signal from the load cells, as well. If the excitation signal is attenuated from 15 volts to 5 volts for example, then the maximum output signal which can be produced by the load cells will similarly be reduced from 30 mv to 10 mv. In this event, a one grad change in the output provided by a ten load cell arrangement will be reduced to 0.6 uv, which is below the 0.75 uv sensitivity threshold of the instrument. The instrument will then be unable to accurately measure one grad changes in the output signal provided by the multiple load cell arrangement.

The attenuation introduced by the intrinsic safety barriers can be expressed as a fraction A such that $E_2 = AE_1$, where $E_1$ is the excitation voltage provided at the output terminals 94 and 96 of instrument 90, and $E_2$ is the voltage actually arriving at the load cells (see FIG. 4). The attenuation factor A can be calculated as follows.

The excitation voltage $E_2$ appearing across the excitation input terminals to the load cells is equal to the current passing through the load cells ($I_1$) times the equivalent resistance of the load cells ($R_{el}$). The current $I_1$, however, is equal to the excitation voltage $E_1$ provided by the instrument 90, divided by the total resistance in the current loop, which in turn is equal to the equivalent resistance of the load cells ($R_{el}$) plus the series resistances of intrinsic safety barriers 110 and 112. If each of the intrinsic safety barriers is presumed to have a series resistance of $R_1$, then:

$$I_1 = E_1/(R_{el} + 2R_1)$$

The voltage $E_2$ appearing at the excitation input terminals of the load cells is therefore equal to:

$$E_2 = \frac{R_{el}E_1}{(R_{el} + 2R_1)} = AE_1 \qquad (2)$$

where $$A = R_{el}/(R_{el} + 2R_1)$$

Since the plural load cells are identical and are connected in parallel with one another, the equivalent resistance $R_{el}$ of the load cell circuitry 72 is equal to the equivalent resistance of a single load cell, divided by the number of load cells. The resistance of a single load cell, however, is equal to the resistance ($R_b$) in one of the legs of the bridge plus the resistance value ($R_c$) of the temperature compensation and calibration resistances 82 and 84 (see FIG. 3). Thus, the equivalent resistance of the multiple load cell circuit 72 will be:

$$R_{el} = (R_b + R_c)/N \qquad (3)$$

By substituting this equation into equation (2) it can be determined that the excitation voltage is attenuated by a factor A which is equal to:

$$A = \frac{(R_b + R_c)/N}{2R_1 + (R_b + R_c)/N} \qquad (4)$$

$R_c$ is typically equal to approximately 0.25 $R_b$, thus equation (4) can be rewritten as:

$$A = \frac{1.25R_b/N}{2R_1 + 1.25R_b/N} \qquad (5)$$

The output signal provided by the load cells will be attenuated by the same fraction. Thus, although at zero attenuation (i.e., A = 1) the output signal per graduation provided by the load cells will be equal to 30 mv times 0.0006/N, with intrinsic safety barriers the output signal per grad provided by the load cells will instead be equal to:

$$\text{mv/grad} = \frac{(30\text{mv})(.0006/N)(1.25R_b/N)}{(2R_1 + 1.25R_b/N)} \quad (6)$$

As state above, however, the output voltage per graduation provided by the load cells must be greater than the minimum sensitivity of the instrument, which has been stated as being 0.75 uv in the example being described. Thus, the results of evaluation of the equation (6) for particular values $R_b$ and N must be greater than 0.75 uv, in order for the instrument to be able to measure one grad variations in the output signal provided by the multiple load cell arrangement.

Conventional load cells have bridge resistances $R_b$ equal to 350 ohms. By substituting this value for $R_b$ in equaltion 5 above, the following expression results:

$$\text{uv/grad} = \frac{(18\text{uv}/N)(437.5/N)}{167 + 437.5/N} \quad (7)$$

By substituting specific values of N into the expression of equation (7), it can be found that if N is greater than 6, the microvolts per graduation output of the multiple load cell arrangement will be below the 0.75 uv per grad sensitivity of the instrument. Consequently, no more than six load cells can be connected in parallel without reducing the microvolts per grad output of the cells below a measurable level.

It may not even be possible to include six conventional load cells in a multiple cell arrangement with intrinsic safety barriers, due to other limitations. As stated previously, intrinsic safety barriers introduce a limit into the amount of excitation current which can be supplied to the multiple load cell arrangement through the excitation terminals of the instrument 90. Equation (1) defines the excitation current $I_1$ in terms of the excitation voltage $E_1$, the equivalent excitation lead resistance $R_{el}$, and the intrinsic safety barrier series resistances $R_1$. The magnitude of the equivalent resistance on the excitation leads ($R_{el}$) is set forth in equation (3). By substituting equation (3) into equation (1), the following expression results.

$$I_1 = E_1/(2R_1 + (R_b + R_c)/N) \quad (8)$$

Using the rule of thumb that the compensation and calibration components $R_c$ will equal approximately 0.25 $R_b$, equation (8) can be simplified as:

$$I_1 = E_1/(2R_1 + 1.25R_b/N) \quad (9)$$

In a conventional system, the excitation voltage $V_1$ would be 15 volts, the load cell bridge resistance $R_b$ would be 350 ohms, and the intrinsic safety barrier series resistance $R_1$ would be 83.5 ohms. Thus, the current $I_1$ could be expressed in terms of the number of load cells N as follows:

$$I_1 = 15/(437.5/N + 167) \quad (10)$$

From this expression, it can be seen that the current $I_1$ increases as the function of the number of load cells N included in the system. If N is equal to 1, then the current is equal to approximately 25 milliamps (ma). When N is equal to 5, on the other hand, the excitation current increases to nearly 60 ma. When N is equal to 10, the excitation current $I_1$ is equal to approximately 71 ma.

The current limitation established by the intrinsic safety barrier is imposed by the current rating of the series fuse. This may, for example, be 63 ma, very close to the value of the excitation current when five conventional load cells are used in a multiple load cell arrangement. In view of this, no more than four conventional load cell arrangements should be connected in a parallel arrangement and driven through a single set of intrinsic safety barriers.

Both of the problems set forth above, i.e., excess current draw by the multiple load cell arrangement and reduction in the magnitude of the microvolts per grad output of the multiple load cell arrangement can be compensated for by increasing the leg resistance in each of the load cell bridges.

From equation (4) it can be seen that the load cell leg resistance $R_b$ affects the attenuation factor A. As the load cell resistance increases, the attenuation factor A approaches a value of one. As the attenuation factor A approach a value of 1, however, the excitation signal $E_2$ appearing at the load cell inputs approaches the excitation voltage $E_1$ provided by the instrument. The microvolts per grad output of the multiple load cell arrangement can be thus maximized. Similarly, from equation (9) it can be seen that the magnitude of the excitation current $I_1$ diminishes as $R_b$ increases, so that a desired level of excitation current can be obtained by selecting an appropriate value for the load cell leg resistance $R_b$. The sensitivity of both these relations (equations (4) and (9)) to the bridge leg resistance $R_b$ can be used in the design of multiple load cell weighing instruments.

The design approach begins with the selection of the number of load cells to be used in the instrument, determined in accordance with the maximum desired capacity of the instrument and expected distribution of the weight to be measured. Thus, for example, if the maximum scale capacity is to be approximately 350,000 pounds, then ten load cells will included since each load cell conventionally has a capacity of approximately 35,000 pounds. The relations described above are then referred to in order to find the minimum bridge resistance which meets the requirements for excitation load current and microvolt per grad output of the load cell.

Dealing first with the microvolt per grad output of the load cell, it has been stated previously that the maximum cell output is approximately 30 millivolts (or 30,000 microvolts), presuming a full 15 volt excitation voltage, and that the output change per graduation will be approximately 0.06%/N, where N is the number of load cells in the system. Thus, the microvolts per grad output of the load cell will be equal to:

$$\text{uv/grad} = 30,000 \text{ uv}(0.0006/N)A. \quad (11)$$

where A is the attenuation factor defined in equation (4), above. If N is equal to ten, the above equation reduces to:

$$\text{uv/grad} = (1.8)A \quad (12)$$

The microvolt per grad reading must be greater than the 0.75 microvolts sensitivity of the instrument, hence A must be greater than approximately 0.42. Substituting this into equation (4), and setting N equal to 10, $R_1$ equal to 83.5, and $R_c$ equal $0.25R_b$, we get:

$$A = (0.125R_b)/(167 + 0.125R_b) > 0.42 \quad (13)$$

Solving this equation for $R_b$ we find that $R_b$ must be greater than approximately 1,000 ohms, in order to satisfy the requirement that the microvolts per grad output of the multiple load cell arrangement be within the measuring capabilities of the instrument.

Turning now to the other criterion, excitation current, the minimum value of $R_b$ can be determined from equation (9). Setting the maximum current $I_1$ equal to 63 ma, the excitation voltage $V_1$ equals to 15 volts, N equal to 10, and $R_1$ equal to 82.5 ohms, we obtain the following expression:

$$I_1 = 15/(0.125R_b + 167) < 63 \text{ ma} \quad (14)$$

Solving this for $R_b$, we find that $R_b$ must be greater than or equal to approximately 600 ohms. Thus, in this circumstance, the reduced microvolts per grad output of the load cell system becomes the limiting factor, and establishes the minimum of $R_b$. Although the sensitivity condition will be met whenever $R_b$ is greater than approximately 1,000 ohms, conservative design approach dictates that a resistance level somewhat higher than this be used. In the specific example, a load cell with leg resistance of approximately 2,000 ohms would be preferred.

The method of manufacturing bridges for use in such load cells is well known and will therefore not be detailed herein. Suffice it to say that it is known how to manufacture strain gauge bridges having a selected leg resistance.

A ten load cell system can thus be devised for use with intrinsic safety barriers, where the bridge leg resistances of each of the load cells is equal to 2,000 ohms. The resulting system will meet both the minimum microvolt per grad output requirement for the multiple load cell arrangement and the maximum permissible excitation load current limitation.

The described design method can be employed to design a load cell system employing any arbitrary number N of load cells.

Although the invention has been described with respect to a preferred embodiment, it will be appreciated that various rearrangements and alterations of parts may be made without departing from the spirit and scope of the present invention, as defined in the appended claims.

What is claimed is:

1. Weighing apparatus, comprising
    more than four load cells, each having excitation input terminals and signal output terminals, all of said excitation input terminals being connected in parallel and all of said signal output terminals being connected in parallel,
    voltage source means supplying an excitation voltage (V) across output terminals thereof,
    means for coupling said voltage source output terminals across said parallel-connected excitation input terminals of said load cells, said means including at least one intrinsic safety barrier, said intrinsic safety barrier attenuating said excitation voltage ($E_1$) such that only a fraction (A) of said voltage reaches said excitation input terminals, and
    voltage measuring means coupled to said parallel connected signal output terminals, said voltage measuring means having a sensitivity of (S) voltage units per graduation of input signal change,
    wherein the internal resistances of said load cells are such that
    (1) no more than a preselected level of load current passes through said at least one intrinsic safety barrier, and
    (2) the fraction A has a value such that ($E_G$) times (A) is greater than (S), where $E_G$ is the output voltage variation per grad weight change when A is equal to one.

2. Weighing apparatus as set forth in claim 1 wherein said load cell resistance is selected such that $$\frac{R_{el}}{R_T + R_{el}} > S/E_G$$

where $R_{el}$ is the equivalent resistance of the parallel connected load cells and $R_T$ is the total series resistance of said at least one intrinsic safety barrier.

3. Weighing apparatus as set forth in claim 1, wherein each said load cell includes a bridge network, including four equal resistance strain gauge elements, and other resistances such that the internal resistance of said load cells is equal to $R_b + R_c$ where $R_b$ is the resistance of each said strain gauge element and $R_c$ represents the net resistance of said other resistances, whereby the equivalent resistance ($R_{el}$) of said plural load cells is:

$$R_{el} = (R_b + R_c)/N$$

where N is the number of load cells, and further wherein said strain gauge element resistance $R_b$ is such that:

$$\frac{(R_b + R_c)/N}{R_T + (R_b + R_c)/N} > S/E_G$$

where $R_T$ is the total series resistance of said at least one intrinsic safety barrier.

4. Weighing apparatus as set forth in claim 3, wherein said strain gauge element resistance is also great enough that:

$$E_1/[R_T + (R_b + R_c)/N] < I_L,$$

where $I_L$ is the excitation current limit imposed by said at least one intrinsic safety barrier.

5. Weighing apparatus, comprising
    more than four load cells, each having excitation input terminals and signal output terminals, all of said excitation input terminals being connected in parallel and all of said signal output terminals being connected in parallel,
    voltage source means supplying an excitation voltage across output terminals thereof,
    means for coupling said voltage source output terminals across said parallel-connected excitation input terminals of said load cells, said means including at least one intrinsic safety barrier, and
    voltage measuring means coupled to said parallel connected signal output terminals,
    wherein said load cells each comprises a bridge network including four strain gauge elemens, each element having a resistance greater than one thousand ohms.

6. Weighing apparatus as set forth in claim 5, wherein each of said strain gauge elements has a resistance on the order of 2,000 ohms.

* * * * *